US010793118B1

(12) United States Patent
Bowman

(10) Patent No.: US 10,793,118 B1
(45) Date of Patent: Oct. 6, 2020

(54) SCISSOR JACK KIT

(71) Applicant: Stephen Bowman, Oklahoma City, OK (US)

(72) Inventor: Stephen Bowman, Oklahoma City, OK (US)

( * ) Notice: Subject to any disclaimer, the term of this patent is extended or adjusted under 35 U.S.C. 154(b) by 322 days.

(21) Appl. No.: 15/421,646

(22) Filed: Feb. 1, 2017

(51) Int. Cl.
  *B66F 3/12* (2006.01)
  *B60S 9/06* (2006.01)
  *B66F 3/08* (2006.01)
  *B66F 3/44* (2006.01)

(52) U.S. Cl.
  CPC ........ *B60S 9/06* (2013.01); *B66F 3/08* (2013.01); *B66F 3/12* (2013.01); *B66F 3/44* (2013.01); *B66F 2700/04* (2013.01)

(58) Field of Classification Search
  CPC ...... B66F 3/12; B66F 3/44; B66F 3/22; Y10S 254/02; Y10S 254/01; B60S 9/06
  USPC ............ 254/418–424, 133 R, 126, 122, 124, 254/DIG. 1, 100, 131, 85; 269/257; D34/31
  See application file for complete search history.

(56) References Cited

U.S. PATENT DOCUMENTS

| | | | | |
|---|---|---|---|---|
| 1,382,733 A | * | 6/1921 | Lanier | B66F 3/12 254/122 |
| 1,786,305 A | * | 12/1930 | James | B66F 3/12 254/126 |
| 2,508,934 A | * | 5/1950 | Berg | B66F 3/12 254/122 |
| 3,938,780 A | | 2/1976 | Hauptman | |
| 3,997,143 A | * | 12/1976 | Rose | B60S 9/06 254/122 |
| 4,025,053 A | * | 5/1977 | Stickle, Jr. | B66F 3/12 254/122 |
| 4,055,329 A | * | 10/1977 | Hammond | B66F 3/12 254/126 |
| 4,653,727 A | * | 3/1987 | Chang | B66F 3/12 254/1 |
| 4,784,400 A | * | 11/1988 | Hofius | B60S 9/10 254/122 |
| 4,836,502 A | * | 6/1989 | Yamauchi | B66F 3/12 254/126 |

(Continued)

FOREIGN PATENT DOCUMENTS

FR 2389571 * 12/1978
WO WO 2017/149504 * 3/2017

*Primary Examiner* — Monica S Carter
*Assistant Examiner* — Mahdi H Nejad

(57) ABSTRACT

A scissor jack kit to elevate each vehicle quadrant for maintenance including one scissor jack for each wheel. Each scissor jack includes a parallelepiped bottom base, a lower support base atop thereof, and mirror image first and second arms, each having top and bottom ends hinged at a central elbow. Each of proximal and distal ends of the bottom and top ends, respectively, pivotably couples to the respective lower and upper support base. An aperture in the central elbow receives a rotatable leadscrew therethrough having a socket with a hole which receives a hook of a jack speed crank handle to rotate the leadscrew to adjust the scissor jack height. Mount holes in the upper support base provide for chassis mounting. A groove in an axle mount body on the upper support base supports the axle proximal the respective wheel and has a cushioned lining thereon.

10 Claims, 6 Drawing Sheets

(56) References Cited

U.S. PATENT DOCUMENTS

| | | | |
|---|---|---|---|
| 4,982,930 A * | 1/1991 | Stewart | B66F 3/12 |
| | | | 254/124 |
| 5,085,407 A * | 2/1992 | Lonon | B66F 3/44 |
| | | | 254/103 |
| 5,176,362 A | 1/1993 | Seksaria et al. | |
| 5,211,375 A | 5/1993 | Wang | |
| D340,566 S | 10/1993 | Thomas | |
| 5,603,486 A | 2/1997 | Liu | |
| 6,029,950 A * | 2/2000 | Yeh | B66F 3/12 |
| | | | 254/126 |
| 6,237,953 B1 | 5/2001 | Farmer | |
| 6,299,138 B1 * | 10/2001 | Huang | B66F 3/12 |
| | | | 254/103 |
| 6,334,605 B1 * | 1/2002 | Kikuchi | B66F 3/12 |
| | | | 254/122 |
| 6,422,536 B1 * | 7/2002 | Kelley | B66F 7/0641 |
| | | | 254/10 R |
| 6,695,289 B1 * | 2/2004 | Mickael | B66F 3/12 |
| | | | 187/211 |
| 6,910,677 B1 * | 6/2005 | Miller | B66F 3/12 |
| | | | 254/103 |
| 6,910,680 B1 | 6/2005 | Geller | |
| 2005/0092975 A1 * | 5/2005 | Tarra | B66F 3/12 |
| | | | 254/122 |
| 2007/0284499 A1 * | 12/2007 | Hammac | B66F 3/12 |
| | | | 248/346.01 |
| 2009/0057634 A1 * | 3/2009 | Giralde | B60S 9/06 |
| | | | 254/424 |
| 2011/0006273 A1 | 1/2011 | Chen | |

* cited by examiner

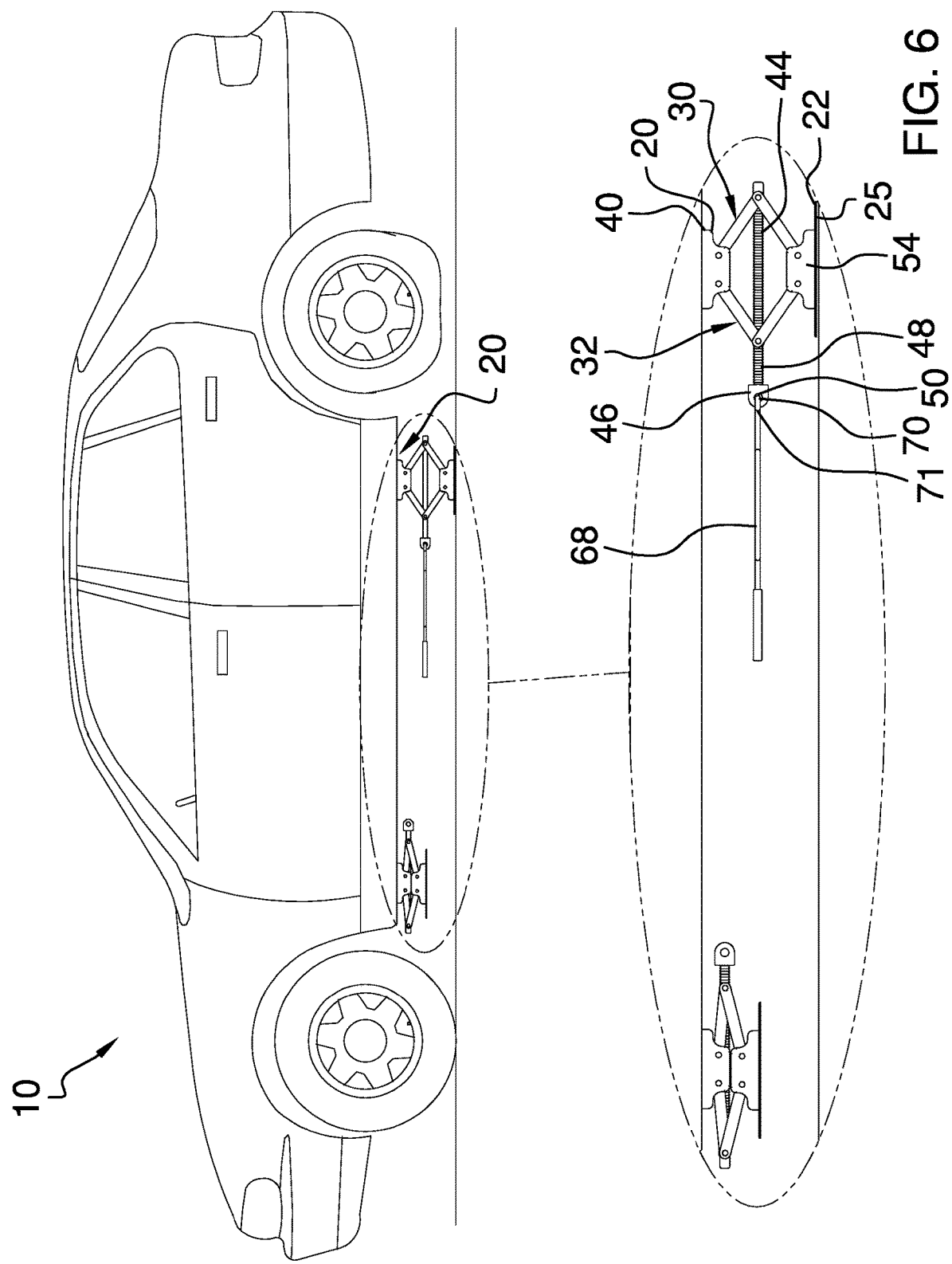

SCISSOR JACK KIT

BACKGROUND OF THE INVENTION

Various types of vehicle jacking devices are known in the prior art. However, what is needed is a scissor jack kit devised to elevate each vehicle quadrant for maintenance including one scissor jack for each wheel. Each scissor jack includes a parallelepiped bottom base, a lower support base atop thereof, and mirror image first and second arms, each having top and bottom ends hinged at a central elbow. Each of proximal and distal ends of the bottom and top ends, respectively, pivotably couples to the respective lower and upper support base. An aperture in the central elbow receives a rotatable leadscrew therethrough having a socket with a hole which receives a hook of a jack speed crank handle to rotate the leadscrew to adjust a height of the device. Mount holes in the upper support base provide for chassis mounting. A groove in an axle mount body on the upper support base supports the axle proximal the respective wheel and has a cushioned lining thereon.

FIELD OF THE INVENTION

The present invention relates to vehicle jacking devices and more particularly, to a scissor jack kit.

SUMMARY OF THE INVENTION

The general purpose of the present scissor jack kit, described subsequently in greater detail, is to provide a scissor jack kit which has many novel features that result in a scissor jack kit which is not anticipated, rendered obvious, suggested, or even implied by prior art, either alone or in combination thereof.

To accomplish this, the present scissor jack kit is devised to elevate each quadrant of a vehicle for performing a maintenance action, such as changing a flat tire, on the vehicle is illustrated. The scissor jack kit includes a plurality of scissor jacks. The plurality of scissor jacks includes one scissor jack for each of a wheel of a vehicle. Each of the plurality of scissor jacks includes a parallelepiped bottom base positionable atop a ground surface, a lower support base centrally disposed atop the bottom base, a first arm and a mirror image second arm. Each of the first and second arms is hingedly conjoined at a central elbow and has a top end and a bottom end hingedly conjoined at the central elbow. The bottom end has a proximal end pivotably coupled to the lower support base. The top end of the both of first and second arms has a distal end pivotably conjoined to a single upper support base. The upper support base is a mirror image of the lower support base. An aperture is centrally disposed through the central elbow of each of the first arm and the second arm. A single leadscrew rotatably extends through the aperture of both the first and second arms. A socket is disposed on an outer end of the leadscrew and has a hole centrally disposed therethrough. A jack speed crank handle is provided to rotate the leadscrew and has a hook on an external end thereof which is engageable to the socket.

Each of the lower and upper support bases has a parallelepiped lower side, a front wall, a rear wall identical to the front wall, and a continuous channel between the lower side, the front wall, and the rear wall. Each of the front and rear walls has a bottom side, a central top side parallel to the bottom side and having a length shorter than a length of the bottom side. A concave notch is disposed between the bottom side and the central top side in a position more proximal the central top side than the bottom side. The bottom base has a length approximately twice a length of the lower side of the lower support base and a width greater than a width of the lower side of the lower support base to provide stability to the device during use.

A plurality of mount holes is disposed through the upper support base. Each of the plurality of mount holes is configured to receive a single fastener of a plurality of fasteners therethrough. The fasteners are configured to mount each of the plurality of scissor jacks to a chassis of the vehicle between a center of the vehicle and the respective wheel in a position proximal the wheel.

Each scissor jack also includes a parallelepiped axle mount body centrally disposed atop the upper support base. The axle mount body has a continuous concave, u-shaped groove centrally disposed therein. The groove is perpendicular to a forward edge of the upper support base. The groove is configured to receive a portion of an axle of the vehicle proximal an interior side of the respective wheel. A cushioned lining is continuously disposed on the entire groove. The cushioned lining conforms to the groove. The cushioned lining is formed of rubber or a rubberized material. The cushioned lining reduces the potential for damage to the axle of the vehicle.

In the event of a flat tire, the bottom base is placed in contact with the ground. Then, the hook of the jack speed crank handle is in inserted into the hole in the socket. The jack speed crank handle is turned to adjust the height of the respective scissor jack to raise the wheel having the flat tire thereon so that the flat tire is lifted from the ground for removal from the wheel. Once the flat tire is replaced with a replacement tire, the jack speed crank handle is turned again to place the replacement tire on the ground and the scissor jack is returned to its original storage location.

Thus has been broadly outlined the more important features of the present scissor jack kit so that the detailed description thereof that follows may be better understood and in order that the present contribution to the art may be better appreciated.

BRIEF DESCRIPTION OF THE DRAWINGS

Figures

FIG. 6 is an in-use side elevation view.

DETAILED DESCRIPTION OF THE DRAWINGS

Figure 1:
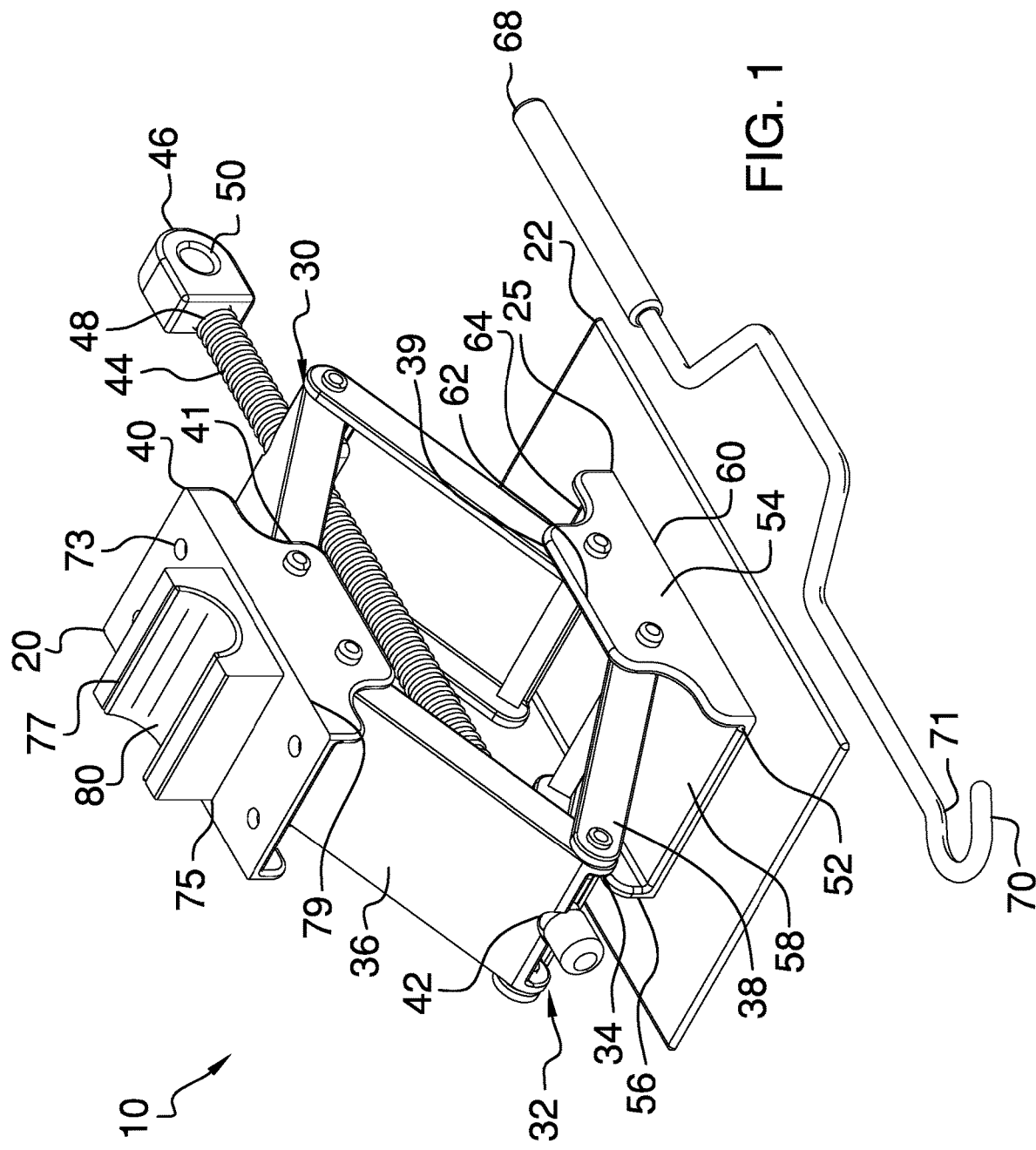
FIG. 1 is an isometric view having an axle mount body disposed atop an upper support base.
Figure 2:
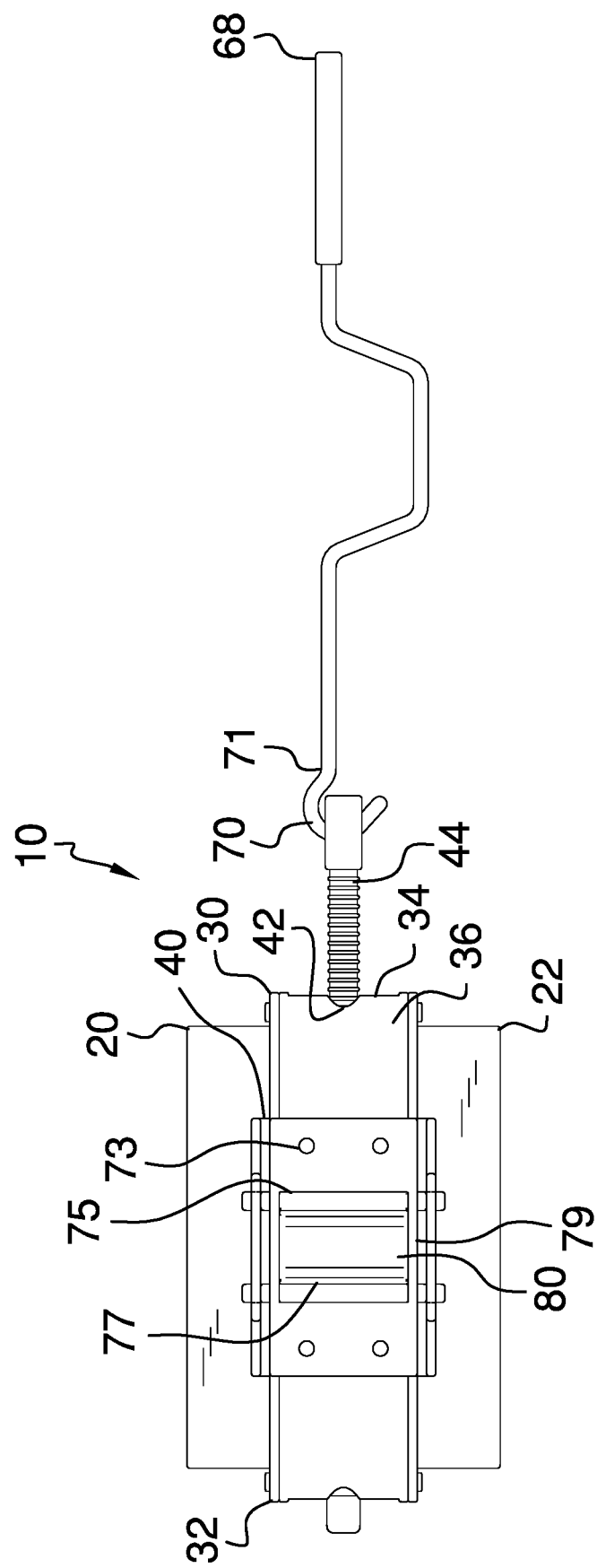
FIG. 2 is a top plan view.
Figure 3:
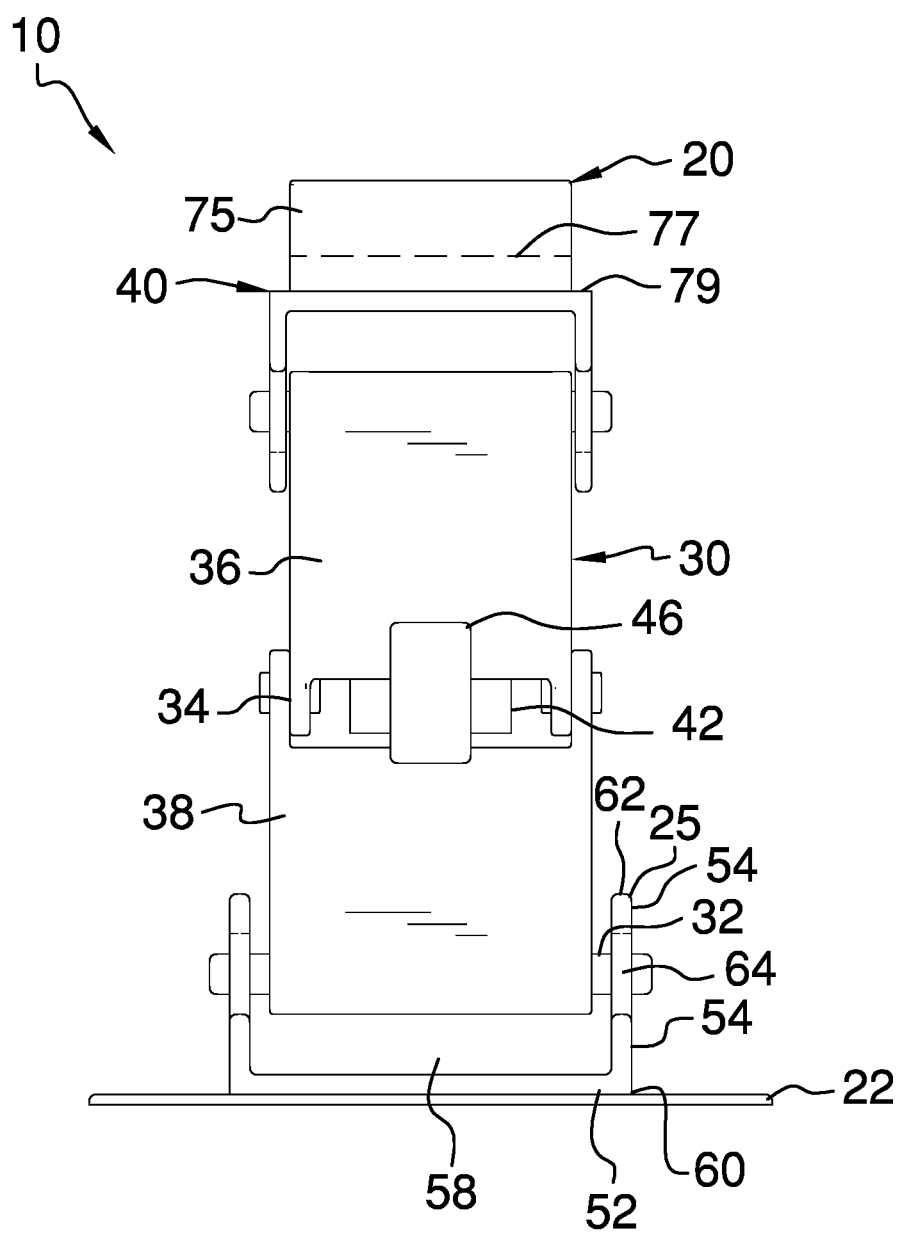
FIG. 3 is a side elevation view.
Figure 4:
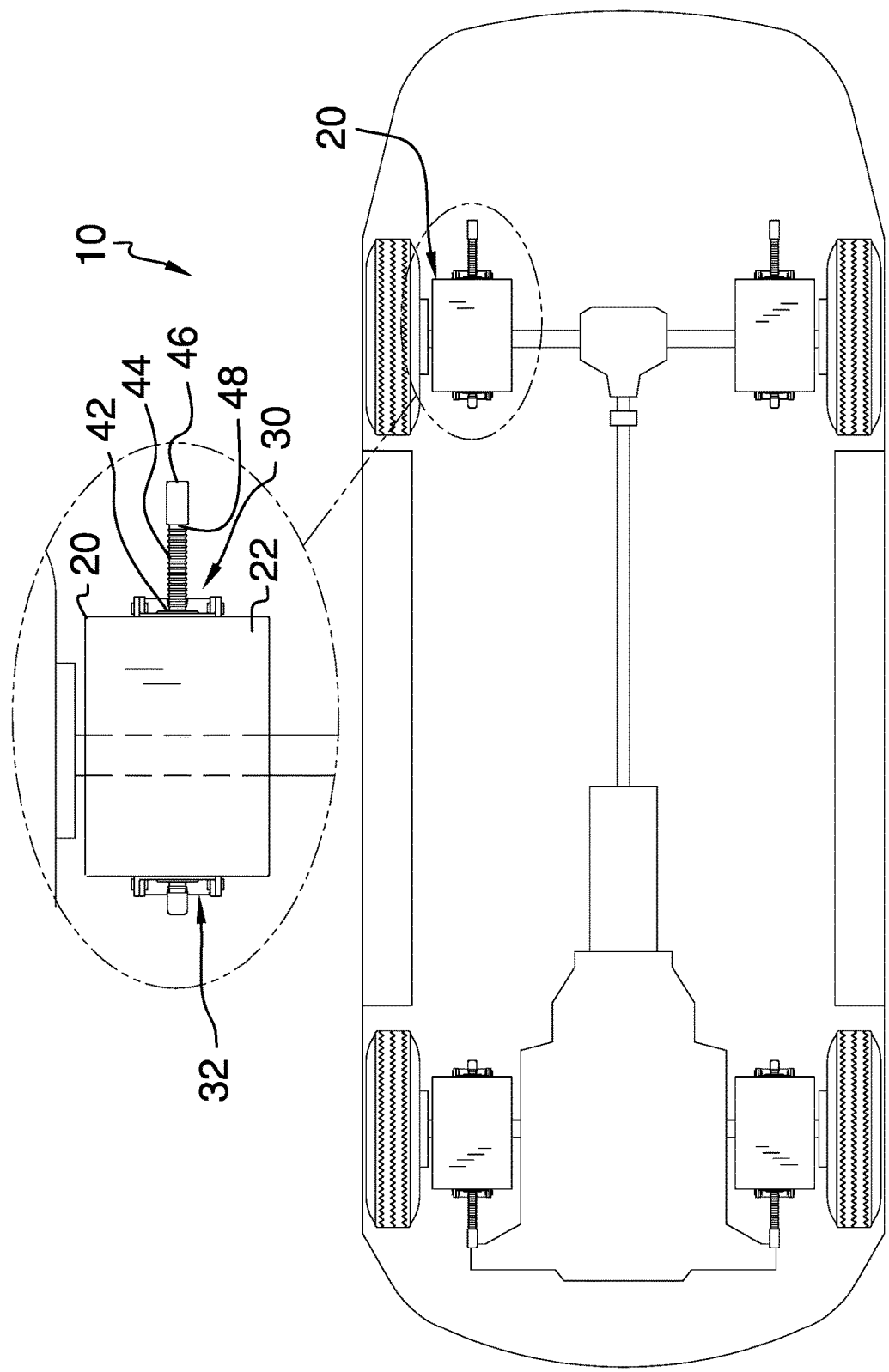
FIG. 4 is an in-use bottom view.
Figure 5:
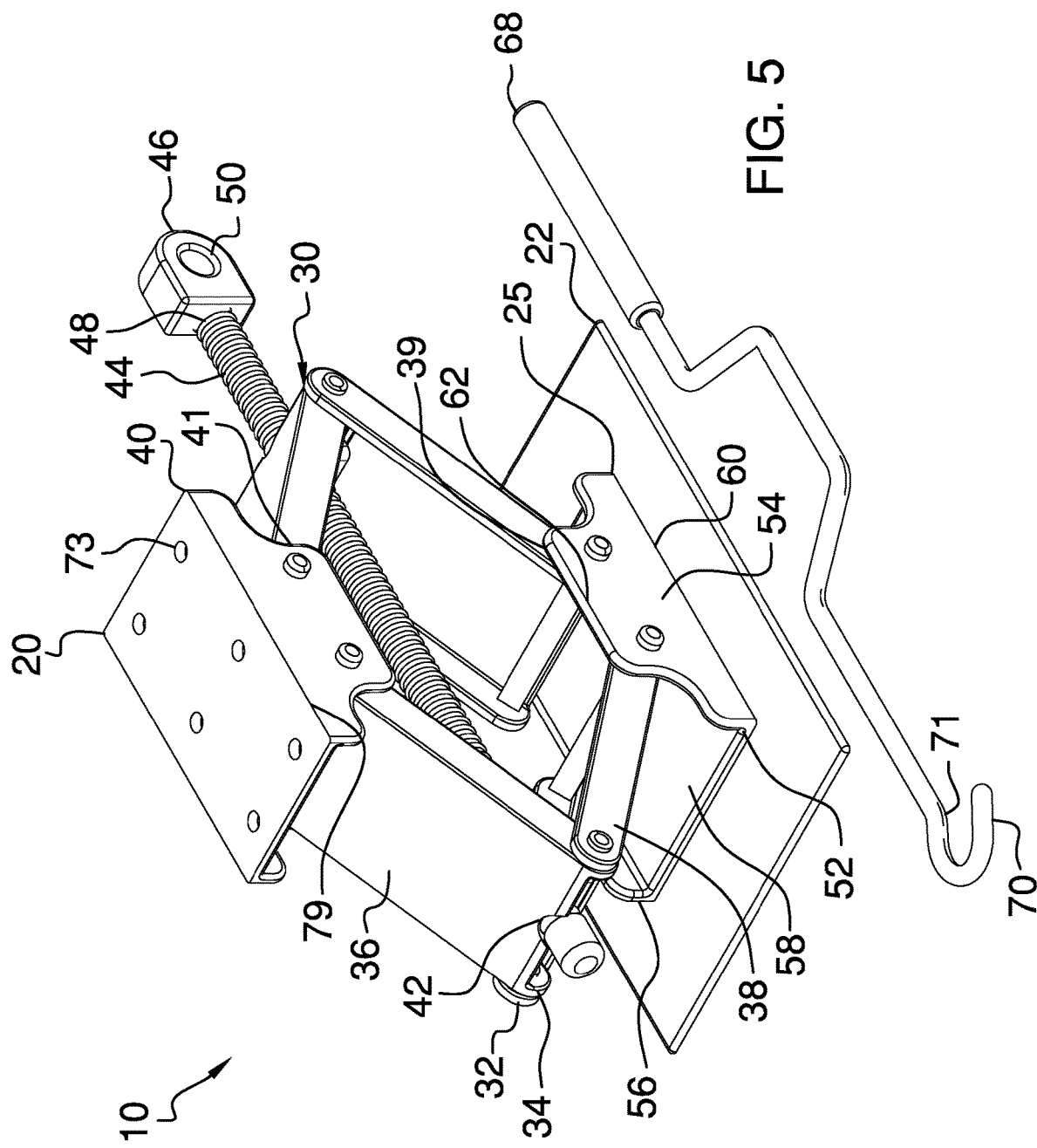
FIG. 5 is an isometric view showing the upper support base.

With reference now to the drawings, and in particular FIGS. 1 through 6 thereof, an example of the instant scissor jack kit employing the principles and concepts of the present scissor jack kit and generally designated by the reference number 10 will be described.

Referring to FIGS. 1 through 6 the present scissor jack kit 10 devised to elevate each quadrant of a vehicle for performing a maintenance action, such as changing a flat tire, on the vehicle is illustrated. The scissor jack kit 10 includes a plurality of scissor jacks 20. The plurality of scissor jacks 20 includes one scissor jack 20 for each of a wheel of a vehicle. Each of the plurality of scissor jacks 20 includes a parallelepiped bottom base 22 positionable atop a ground surface and a lower support base 25 centrally disposed atop the bottom base. Each scissor jack 20 also has a first arm 30 and a second arm 32, which is a mirror image of the first arm 30. Each of first arm 30 and the second arm 32 is hingedly conjoined at a central elbow 34. Each of the first arm 30 and the second arm 32 has a top end 36 and a bottom end 38 hingedly conjoined at the central elbow 34. The bottom end 38 has a proximal end 39 pivotably coupled to the lower support base 25. The top end 36 of the both of first and second arms 30, 32 has a distal end 41 pivotably conjoined to a single upper support base 40. The upper support base 40 is a mirror image of the lower support base 25. An aperture 42 is centrally disposed through the central elbow 34 of each of the first arm 30 and the second arm 32. A single leadscrew 44 rotatably extends through the aperture 42 of both the first and second arms 30, 32. A socket 46 is disposed on an outer end 48 of the leadscrew 44. The socket 46 has a hole 50 disposed therethrough.

Each of the lower support base 25 and the upper support base 40 has a parallelepiped lower side 52, a front wall 54, a rear wall 56 identical to the front wall 54, and a continuous channel 58 between the lower side 52, the front wall 54, and the rear wall 56. Each of the front and rear walls 54, 56 has a bottom side 60, a central top side 62 parallel to the bottom side 60 and having a length shorter than a length of the bottom side 60. A concave notch 64 is disposed between the bottom side 60 and the central top side 62 in a position more proximal the central top side 62 than the bottom side 60. The bottom base 22 has a length approximately twice a length of the lower side 52 of the lower support base 25 and a width greater than a width of the lower side 52 of the lower support base 25.

A jack speed crank handle 68 is provided to rotate the leadscrew 44. The jack speed crank handle 68 has a hook 70 on an external end 71 thereof. The hook 70 is engageable to the socket 46. A height of the respective scissor jack 20 is adjusted by rotating the leadscrew 44 with the jack speed crank handle 68.

A plurality of mount holes 73 is disposed through the upper support base 40. Each of the plurality of mount holes 73 is configured to receive a single fastener of a plurality of fasteners therethrough. The fasteners are configured to mount each of the plurality of scissor jacks 20 to a chassis of the vehicle between a center of the vehicle and the respective wheel in a position proximal the wheel.

Each scissor jack 20 also includes a parallelepiped axle mount body 75 centrally disposed atop the upper support base 40. The axle mount body 75 has a continuous concave, u-shaped groove 77 centrally disposed therein. The groove 77 is perpendicular to a forward edge 79 of the upper support base 40. The groove 77 is configured to receive a portion of an axle of the vehicle proximal an interior side of the respective wheel.

A cushioned lining 80 is continuously disposed on the entire groove 77. The cushioned lining 80 conforms to the groove 77. The cushioned lining 80 is formed of rubber or a rubberized material. The cushioned lining 80 reduces the potential for damage to the axle of the vehicle.

What is claimed is:

1. A vehicle chassis scissor jack kit comprising:
  a plurality of scissor jacks, the plurality of scissor jacks comprising one scissor jack for each wheel of a vehicle, each of the plurality of scissor jacks comprising:
  a parallelepiped bottom base positionable atop a ground surface; a lower support base centrally disposed atop the bottom base;
  a first arm and a second arm, each of the first arm and the second arm hingedly conjoined at a central elbow, each of the first arm and the second arm having a top end and a bottom end hingedly conjoined together at the central elbow, the bottom end having a proximal end pivotably coupled to the lower support base, the top end of the first and second arms having a distal end pivotably conjoined to a single upper support base, the upper support base being a mirror image of the lower support base;
  wherein each of the lower support base and the upper support base has a parallelepiped lower side, a front wall, a rear wall identical to the front wall, and a continuous channel between the lower side, the front wall, and the rear wall, each of the front and rear walls having a bottom side, a central top side parallel to the bottom side and having a length shorter than a length of the bottom side, and a concave notch disposed between the bottom side and the central top side in a position more proximal the central top side than the bottom side;
  a plurality of mount holes disposed through the upper support base;
  an aperture centrally disposed through the elbow of each of the first arm and the second arm;
  a single leadscrew rotatably extending through the aperture of the first arm and the second arm; and
  a socket disposed on an outer end of the leadscrew, the socket having a hole disposed therethrough;
  a jack speed crank handle having a hook on an external end thereof, the hook engageable to the socket.

2. The vehicle chassis scissor jack kit of claim 1 wherein each of the plurality of mount holes is configured to receive a single fastener of a plurality of fasteners therethrough, wherein the fasteners are configured to mount each scissor jack of the plurality of scissor jacks to a chassis of the vehicle between a center of the vehicle and the respective wheel in a position proximal the wheel.

3. The vehicle chassis scissor jack kit of claim 1 comprising:
  a parallelepiped axle mount body centrally disposed atop the upper support base, the axle mount body having a continuous concave u-shaped groove centrally disposed therein, the groove being perpendicular to a forward edge of the upper support base;
  wherein the groove is configured to receive a portion of an axle of the vehicle proximal an interior side of the respective wheel.

4. The vehicle scissor jack kit of claim 1 wherein the bottom base has a length approximately twice a length of the lower side of the lower support base and a width greater than a width of the lower side of the lower support base.

5. The vehicle scissor jack kit of claim 3 comprising:
  a cushioned lining continuously disposed on an entirety of the groove, the cushioned lining conforming to the groove.

6. The vehicle scissor jack kit of claim 5 wherein the cushioned lining is formed of rubber.

7. The vehicle scissor jack kit of claim 5 wherein the cushioned lining is formed of a rubberized material.

8. A vehicle chassis scissor jack kit comprising:
  a plurality of scissor jacks, the plurality of scissor jacks comprising one scissor jack for each wheel of a vehicle, each of the plurality of scissor jacks comprising:
  a parallelepiped bottom base positionable atop a ground surface; a lower support base centrally disposed atop the bottom base;

a first arm and a second arm, each of the first arm and the second arm hingedly conjoined at a central elbow, each of the first arm and the second arm having a top end and a bottom end hingedly conjoined together at the central elbow, the bottom end having a proximal end pivotably coupled to the lower support base, the top end of the first and second arms having a distal end pivotably conjoined to a single upper support base, the upper support base being a mirror image of the lower support base;

wherein each of the lower support base and the upper support base has a parallelepiped lower side, a front wall, a rear wall identical to the front wall, and a continuous channel between the lower side, the front wall, and the rear wall, each of the front and rear walls having a bottom side, a central top side parallel to the bottom side and having a length shorter than a length of the bottom side, and a concave notch disposed between the bottom side and the central top side in a position more proximal the central top side than the bottom side;

a plurality of mount holes disposed through the upper support base;

an aperture centrally disposed through the elbow of each of the first arm and the second arm;

a single leadscrew rotatably extending through the aperture of the first arm and the second arm; and a socket disposed on an outer end of the leadscrew, the socket having a hole disposed therethrough;

a jack speed crank handle having a hook on an external end thereof, the hook engageable to the socket;

an axle mount with a u-shaped groove disposed atop the upper support base and a cushioned lining continuously disposed on an entirety of the groove, the cushioned lining conforming to the groove.

9. The vehicle scissor jack kit of claim 8 wherein the cushioned lining is formed of rubber.

10. The vehicle scissor jack kit of claim 8 wherein the cushioned lining is formed of a rubberized material.

\* \* \* \* \*